June 22, 1954   R. HEIDECKE   2,681,600
CARRYING CASE FOR PHOTOGRAPHIC CAMERAS
Filed Jan. 27, 1951   3 Sheets-Sheet 1

Reinhold Heidecke
*INVENTOR,*

BY Charles Shepard
*ATTORNEY*

June 22, 1954  R. HEIDECKE  2,681,600
CARRYING CASE FOR PHOTOGRAPHIC CAMERAS
Filed Jan. 27, 1951  3 Sheets-Sheet 2

Reinhold Heidecke
INVENTOR,

BY Charles Shepard
ATTORNEY

Reinhold Heidecke
INVENTOR,

BY Charles Shepard
ATTORNEY

Patented June 22, 1954

2,681,600

UNITED STATES PATENT OFFICE 2,681,600

CARRYING CASE FOR PHOTOGRAPHIC CAMERAS

Reinhold Heidecke, Braunschweig, Germany, assignor to Franke & Heidecke, Fabrik Photographischer Präzisions - Apparate, Braunschweig, Germany, a firm of Germany Application January 27, 1951, Serial No. 208,099

8 Claims. (Cl. 95—11)

The present invention relates to carrying means for photographic cameras, and particularly to carrying cases of the type known as ever-ready cases, so constructed that the camera does not have to be removed from the carrying case in order to take a picture, but merely a part of the carrying case may be opened up to enable a picture to be taken. More particularly, the present invention deals with ever-ready carrying cases for photographic cameras of the known type in which a reflex view finder is arranged at the top of the camera body. For cameras of this type it is necessary, of course, to be able quickly to provide a suitable opening at the top of the carrying case in order to enable the photographer to use the reflex view finder, and also to provide a suitable opening at the front of the carrying case, so as not to obstruct the photographic lens, and also the finder lens if the finder is provided with a separate lens of its own.

An object of the present invention is the provision of a generally improved and more satisfactory ever-ready carrying case of the character above mentioned.

Another object is the provision of such a carrying case so designed and constructed that when the movable parts of the case are moved to their open positions for taking a picture, these movable parts will lie in compact position relative to each other, so as not to be an inconvenience, distraction, or impediment to the photographer.

Still another object is the provision of a carrying case so designed and constructed that when the case is moved to an open position, the movement of the case will automatically open or assist in opening the finder hood to its erect position ready for framing the field of view of the camera, and the closing movements of the case will likewise close or assist in closing the finder hood to its folded or closed position.

A further object is the provision of a carrying case having simple means for latching the side walls of the case to the side walls of the camera enclosed therein, so that the side walls of the case will remain in proper position when the case is open without the necessity for any bridge or cross connection between the side walls near the top of the front of the camera.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
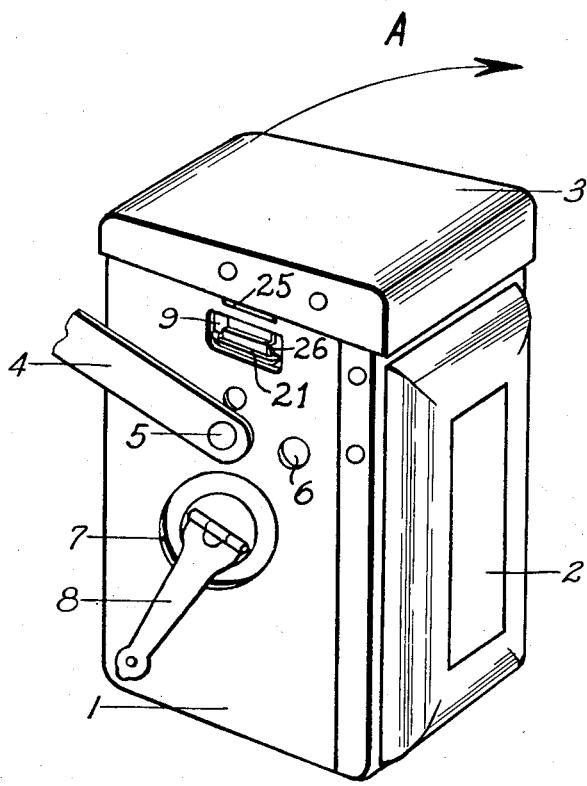
Fig. 1 is a perspective view of a camera and carrying case of the present invention, in closed position.

Referring now to the drawings, in the exemplary embodiment of the invention here shown the cameral case comprises side walls 1 permanently connected to each other by a bottom wall and a rear wall (not shown) together with a movable front wall 2 and a top wall or lid 3. The carrying strap 4, here shown only fragmentarily, has its ends fastened to the side walls 1 by the rivets 5. Suitable openings are provided in the walls 1 so that the camera may be actuated without taking it out of the case. For example, there is an opening 6 through which the usual exposure counter or film position indicator may be observed, and an opening 7 through which the film winding crank 8 projects outwardly to an accessible external position. The camera body itself (as distinguished from the carrying case) is provided with strap loops 21 near the upper edges of the side walls of the camera, through which loops the carrying strap may be threaded when the camera is to be used by itself, without a carrying case. But when the camera is placed in the ever-ready carrying case, the carrying strap is preferably removed from the camera body, and the side walls 1 of the carrying case are provided near their upper edges with openings 9 for receiving the strap loops 21 of the camera.

The front wall 2 of the case is connected with the rest of the case by means of a hinge connection at the lower edge of the front wall 2, which hinge connection may be either in the form of a separate hinge member or in the form of a flexible strip (leather, for example) attached to or integral with the rest of the carrying case.

Figure 4:
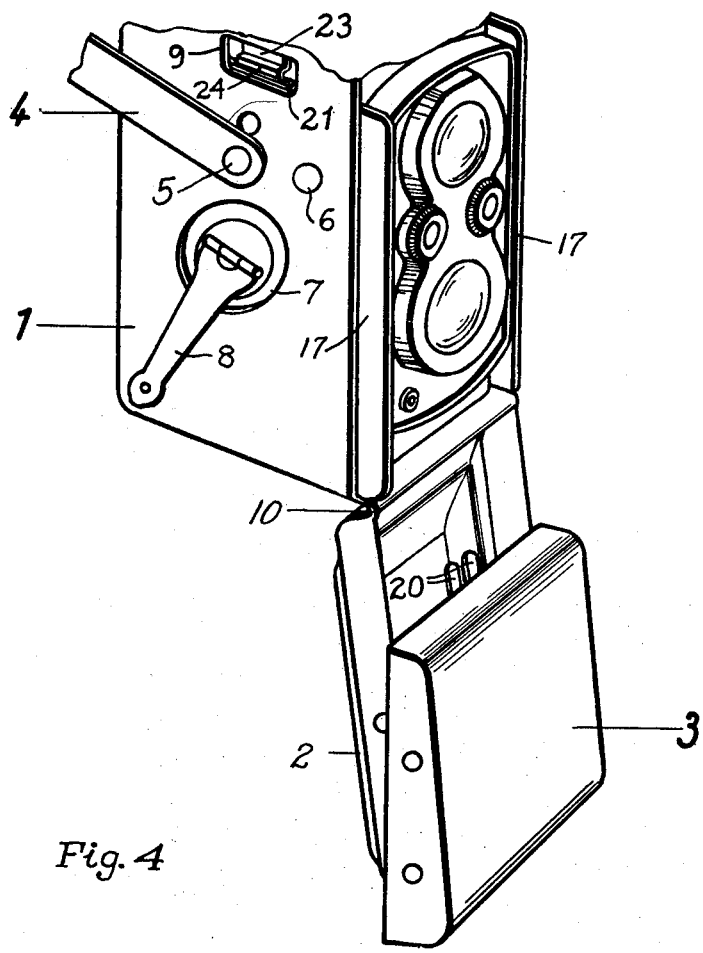
Fig. 4 is a fragmentary perspective view similar to Fig. 2, showing the case in its fully opened position.

The front wall 2 and the top wall or cover 3 are also hinged to each other, but by means of a hinge which constantly tends, with slight force, to fold the member 3 flat against the member 2, as shown in Fig. 4. To this end, strips 11 of metal, for example, are riveted to the inner surfaces of the side flanges of the front wall 2, and corresponding strips 12 are riveted to the inner surfaces of the side flanges of the top wall or cover 3, and these strips 11 and 12 are respectively hinged to each other by means of the rivet pins 13, forming the hinge axis on which the cover 3 may turn relative to the wall 2. A helical spring 14 surrounds the pivot 13 and has its ends hooked over the strips 11 and 12 as indicated respectively at 15 and 16, Fig. 3, this spring constantly tending to turn the cover 3 relative to the wall 2 in the counterclockwise direction indicated by the arrow Z in Fig. 3.

In order to open up the carrying case so that the camera may be used to take a picture, the rear edge of the cover 3 is raised upwardly and the cover is slid forwardly far enough so that it may be released and will fall down by gravity, as the front wall 2 likewise falls down about its hinge 10. Gravity will cause the front wall 2 to assume an approximately vertical position hanging from its hinge 10 as in Fig. 4, and the spring 14 will cause the cover 3 to fold up approximately flat against the downwardly hanging wall 2, as likewise shown in Fig. 4. Thus these two parts assume a very compact position, not in the way of the photographer.

Figures 2, 3:
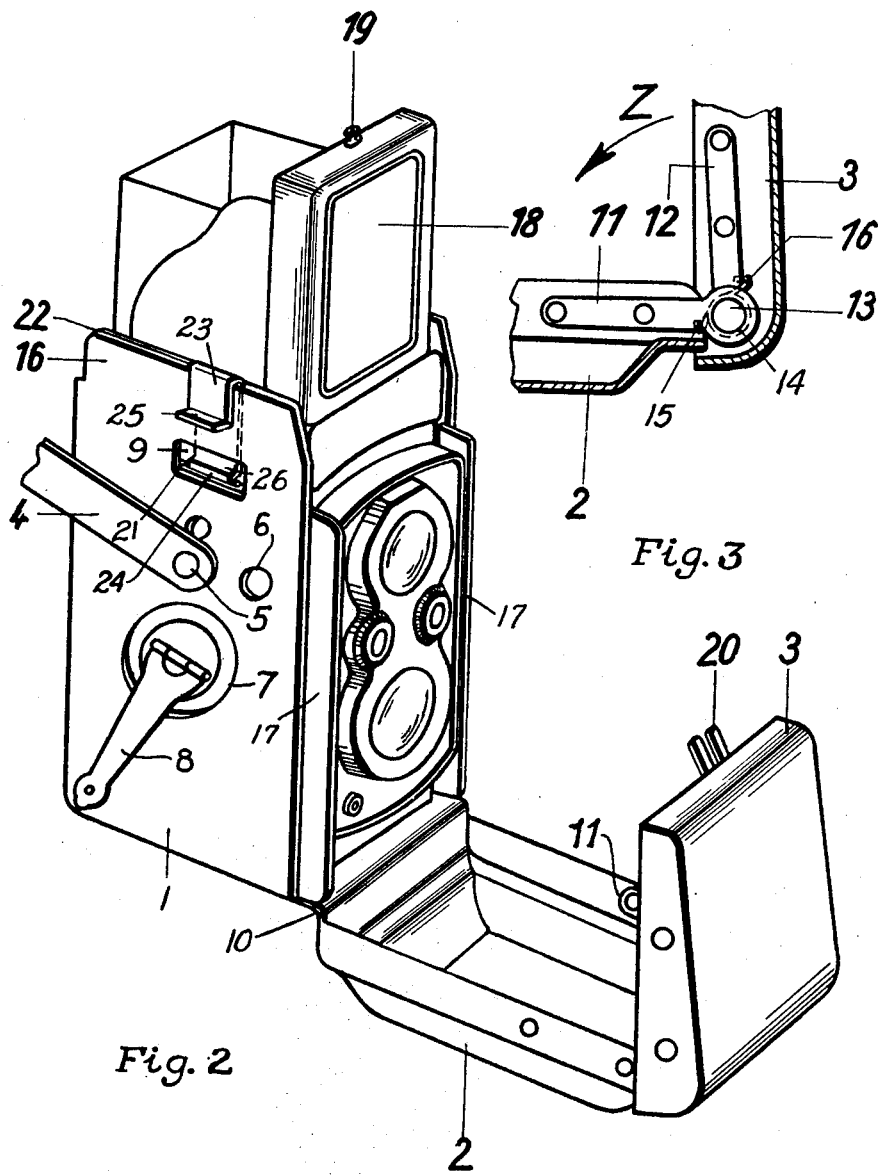
Fig. 2 is a similar view showing the case in partially but not fully opened position.
Fig. 3 is a detailed view partly in vertical section and partly in elevation, of a fragment of the hinge connection between two parts of the case.

When the case is to be closed, the rear edge of the cover 3 is pulled upwardly, swinging the front wall 2 upwardly with it and at the same time unfolding the parts from the folded position shown in Fig. 4 to an approximately right angle position as shown in Fig. 2, and they are then swung further in a counterclockwise direction when viewed as in Fig. 2, to the closed position of Fig. 1, in which position the cover 3 overlies the top of the case and closes it, the side flanges of the cover fitting down outside the top edges of the side walls 1. To assure more complete dust-proof sealing of the front of the case, ledges or flanges 17 project forwardly at the sides of the case just inside the main side walls 1, and the rearwardly extending lateral flanges on the front wall 2 overlap these flanges or ledges 17 when the case is closed.

In certain cameras having a reflex view finder, the focusing hood of the view finder can be opened up or folded down, in known manner, simply by swinging upwardly or downwardly one of the walls of the focusing hood, usually the wall which constitutes the front wall when the hood is in its opened up or erected position. This front wall is indicated at 18 in Fig. 2. As well known in the art, if the upper edge of this wall is swung downwardly and rearwardly, it will automatically collapse all of the various walls constituting the hood. According to the preferred construction, the upper edge of this wall 18 is provided with a pin or handle 19, and the rear edge of the cover member 3 is provided with a forked member 20 so positioned that as the parts 2 and 3 are brought upwardly and then rearwardly to their closed positions, the forked member 20 can be made to engage with the pin 19 on the focusing hood and automatically fold the focusing hood down to its collapsed position as the cover member 3 completes its movement to its own closed position. The parts 19 and 20 remain engaged with each other during this movement, the pin 19 having a portion of reduced diameter as seen in Fig. 2, which is embraced on opposite sides by the arms of the member 20. Thus when the cover 3 is opened to make the camera ready for use, because of the engagement of the parts 19 and 20, the opening movement of the cover will automatically swing the focusing hood wall 18 upwardly and forwardly and the focusing hood will thus be unfolded to its effective position by the mere act of opening up the cover and front of the carrying case.

In order to enable the elimination of any cross member or bridge across the front of the camera to tie the front edges of the two side walls 1 of the case to each other near their upper ends, the present invention provides simple means for latching or fastening the upper parts of these side walls 1 to the camera body itself. It has already been mentioned that the side walls 1 are provided with openings 9 for receiving the belt loops 21 which are fixed to the side walls of the camera body. Moreover, the thickness of the material of which each side wall 1 is made, is slit at 22, the slit extending (intermediate the thickness of the wall) all the way from the upper edge of the side wall 1 down to the opening 9. Movable vertically in these slits 22 are latching members 23, each comprising a strip of some stiff material such as metal, for example, having a lower end 24 to extend down into the camera belt loop 21 when the latching strip 23 is pushed downwardly, and having an upper end which is bent outwardly over the top edge of the wall 1, then downwardly for a distance, and then laterally outwardly again to form a shelf or ledge as at 25. The dimensions are so designed that when the front wall 2 and cover 3 are in their normal closed position, and the latching strip 23 is moved all the way downwardly to its latching position to engage the belt loops of the camera body, the ledge 25 will lie just at the bottom edge of the depending side flanges on the cover member 3, thus preventing accidental upward movement of the latches 23 when the cover is closed, and at the same time insuring that the mere downward closing movement of the cover 3 will, in itself, push the latch members 23 down to their latched position if they are not previously in these positions.

When it is desired to remove the camera from the carrying case, the cover 3 and front wall 2 being opened up, of course, it is a very simple matter to grasp the lateral flanges 25 of the latches 23 and pull these latches upwardly to withdraw the lower ends 24 from the camera belt loops 21. Then the camera may quickly be taken out of the carrying case. Suitable means may be provided for preventing complete withdrawal of the latching members 23 from the camera case, so that the latching members will not be lost. This means may take various forms, one convenient form being the formation of a lateral step 26 in the latching strip 23, near the lower end thereof and within the opening 9 of the carrying case. This step or projection 26 will engage the upper edge of the opening 9 and thus limit the extent of possible upward movement of the latch member 23, allowing it to move upwardly far enough to disengage from the camera belt loops 21, but not allowing it to be completely withdrawn from the slit 22 in which it is guided. Other arrangements for this purpose could be provided, as for example a vertical slot in the member 23, and a rivet in the wall 1 extending through this vertical slot.

The main walls 1, 2, and 3 of the case may be constructed of any suitable material; for example, leather or a leather substitute.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A case for a photographic camera, including bottom and side walls for retaining a camera between them, a front wall having an inner face and hinged to swing from an upstanding closed position forwardly and downwardly to a non-obstructing position so that a camera within said case may take a picture, a top wall forming a cover for the case and connected to the front wall, and spring means tending to swing said top wall to and to hold it in a position approximately against the inner face of said front wall when said front wall is swung down to said non-obstructing position, said spring means serving also to tend to hold the rear edge of said top wall down against the upper edges of said side walls, when said case is in closed position.

2. A construction as defined in claim 1, in which said cover is in the form of a hood-like cap provided with depending lateral flanges which overlap the upper edges of said side walls when said cover is in closed position and a depending rear flange which overlaps the rear edges of said side walls when said cover is in closed position, to restrain said front wall from swinging forwardly until the rear edge of said cover is lifted against the force of said spring means to elevate said rear flange above said side walls.

3. A construction as defined in claim 1, in which a hinge joint is provided between said top wall and said front wall near the front edge of said top wall and the upper edge of said front wall, and in which said spring means is associated with said hinge joint.

4. A construction as defined in claim 1 for use with a camera of the type having belt loops on its side walls, further including movable latches mounted on the side walls of the case and detachably engaging with said belt loops on the camera to latch the side walls of the case to the side walls of the camera to hold the side walls of the case against spreading laterally when the front wall of the case is swung down to its said non-obstructing position.

5. A construction as defined in claim 4, in which said movable latches have parts cooperating with said top wall to be engaged thereby when said top wall is moved to fully closed position, to insure that said latches will be in their effective latched positions when said top wall is fully closed.

6. A construction as defined in claim 5, in which said side walls of said case are provided with approximately vertical slits intermediate the thickness of said side walls, and in which said latches are relatively stiff members mounted for upward and downward sliding movements in said slits.

7. A construction as defined in claim 1, further including in combination with said case a camera of the type having at its top a focusing hood including a front wall mounted to be swung upwardly and forwardly when the hood is erected for use and to be swung downwardly and rearwardly when the hood is collapsed, a projection on said front wall of said hood in position to extend upwardly above said hood when said hood is erected, and a forked member on said cover of said case in position to engage said projection as said cover of said case is moved toward closed position, to impart downward and rearward motion to said front wall of said hood when said cover is moved rearwardly toward closed position.

8. The combination with a photographic camera of the type having at its top a focusing hood including a front wall mounted to be swung upwardly and forwardly when the hood is erected for use and to be swung downwardly and rearwardly when the hood is collapsed, and a projection on said wall in position to extend upwardly above the hood when the hood is erected, said camera also having a lens at its front, of a carrying case for said camera, said case including bottom and side walls collectively forming a pocket for receiving said camera, a front wall hinged at its bottom to swing forwardly and downwardly with respect to a camera in said pocket, to open the front of said case so that light may reach said lens, a cover hinged at its forward edge to the upper edge of said front wall of said case, said cover swinging bodily with said front wall of said case when said front wall of said case is swung, a projection on said cover for engaging said projection on said front wall of said hood as said cover is moved toward closed position, so that closing movement of said cover may be transmitted through the engagement of said two projections to swing said front wall of said hood downwardly and rearwardly to collapsed position as said cover of said case moves downwardly and rearwardly toward its closed position, and a spring operatively connected to said cover and said front wall of said case, to tend to swing said cover downwardly toward the top of the camera when said case is in normal closed position and to tend to swing said cover substantially against the inner face of said front wall of said case when said front wall of said case is swung forwardly and downwardly to an open position.

References Cited in the file of this patent

UNITED STATES PATENTS

| Number | Name | Date |
|---|---|---|
| 1,216,330 | Kroseng | Feb. 20, 1917 |
| 2,136,357 | Darling et al. | Nov. 8, 1938 |
| 2,290,307 | Wicker | July 21, 1942 |
| 2,547,492 | Rohlik | Apr. 3, 1951 |

FOREIGN PATENTS

| Number | Country | Date |
|---|---|---|
| 562,867 | Germany | Oct. 29, 1932 |
| 609,132 | Germany | Feb. 8, 1935 |